US012774726B2

(12) United States Patent
Sardi et al.

(10) Patent No.: US 12,774,726 B2
(45) Date of Patent: Oct. 27, 2026

(54) AIRCRAFT BRAKE WITH THERMAL FUSE

(71) Applicant: Ratier-Figeac SAS, Figeac Cedex (FR)

(72) Inventors: Adil Sardi, Saint Felix (FR); Fabien Ramirez, Tauriac (FR); Patrice Brion, Lunan (FR); Bertrand Prouzet, Figeac (FR)

(73) Assignee: RATIER-FIGEAC SAS, Figeac Cedex (FR)

( * ) Notice: Subject to any disclaimer, the term of this patent is extended or adjusted under 35 U.S.C. 154(b) by 1060 days.

(21) Appl. No.: 17/940,366

(22) Filed: Sep. 8, 2022

(65) Prior Publication Data

US 2023/0082894 A1 Mar. 16, 2023

(30) Foreign Application Priority Data

Sep. 10, 2021 (EP) .................................... 21290056

(51) Int. Cl.
*F16D 65/02* (2006.01)
*F16D 55/00* (2006.01)
*F16D 55/02* (2006.01)

(52) U.S. Cl.
CPC ............. *F16D 65/02* (2013.01); *F16D 55/00* (2013.01); *F16D 2055/0004* (2013.01); *F16D 2065/1388* (2013.01)

(58) Field of Classification Search
CPC ........ F16D 2129/14; F16D 9/02; F16D 55/02; F16D 2065/1388; F16D 2055/0004;
(Continued)

(56) References Cited

U.S. PATENT DOCUMENTS 2,655,015 A * 10/1953 Linder .................. F16D 43/216 192/82 T
3,138,406 A * 6/1964 Chamberlain ........ B60B 25/002 411/501
(Continued)

FOREIGN PATENT DOCUMENTS

FR 2985294 A1 7/2013
GB 798952 7/1958

OTHER PUBLICATIONS

Abstract of FR2985294 (A1), Published: Jul. 5, 2013, 1 page.
European Search Report for Application No. 21290056.7, mailed Mar. 1, 2022, 10 pages.

*Primary Examiner* — Robert A. Siconolfi
*Assistant Examiner* — James K Hsiao
(74) *Attorney, Agent, or Firm* — CANTOR COLBURN LLP

(57) ABSTRACT

A brake for an aircraft includes a housing, a shaft defining an axis (X) and extending into the housing, a floating brake disk on the shaft, the brake disk fixed for rotation with the shaft and arranged to be axially movable within the housing, a static brake pad arranged on a first side of the floating brake disk, a movable brake pad arranged on a second, opposite, side of the floating brake disk and biasing means for moving the movable brake pad relative to the housing to press the movable brake pad against the floating brake disk. The biasing means press the floating brake disk against the static brake pad to apply braking force to the floating brake disk. The brake also includes a thermal fuse in thermal contact with the static brake pad. The thermal fuse has a fusing temperature, T, above which the thermal fuse fuses.

14 Claims, 6 Drawing Sheets

(58) Field of Classification Search
CPC ......... F16D 55/00; F16D 65/02; B64C 27/12; B64C 25/42
USPC ......................................................... 188/18 A
See application file for complete search history.

(56) References Cited

U.S. PATENT DOCUMENTS 3,212,613 A * 10/1965 Carlson ..................... F16D 9/02 192/93 R
3,675,444 A * 7/1972 Whipple ................... F16D 9/02 192/82 T
3,889,789 A * 6/1975 Boehringer ............... F16D 9/02 192/82 T
3,972,399 A * 8/1976 Bopp .................... F16D 35/025 192/58.68
3,991,804 A * 11/1976 Wilson .................... B60C 29/06 152/427
4,086,991 A * 5/1978 Swadley ................... F16D 9/02 192/82 T
4,117,912 A * 10/1978 Ruppe, Jr. ............... F16D 55/40 188/72.3
4,271,947 A * 6/1981 Gaeckle .................... F16D 3/18 192/82 T
4,287,975 A * 9/1981 Tuzson ..................... F16D 9/02 192/82 T
4,373,358 A * 2/1983 Pearch .................... F16D 7/025 192/111.15
4,500,268 A 2/1985 Sundberg et al.
4,561,529 A * 12/1985 McIntosh ................ F16D 43/25 192/82 T
4,703,837 A * 11/1987 Guichard ................ F16D 65/84 188/264 G
4,934,977 A * 6/1990 Falconer ................... F16D 9/02 192/82 T
5,062,503 A * 11/1991 Black ...................... F16D 65/84 188/71.6
5,201,392 A * 4/1993 Kramer ..................... F16D 9/02 192/58.4
5,398,794 A * 3/1995 Walberg ................ F16D 25/063 137/457
5,462,137 A 10/1995 Aubry et al.
5,687,823 A * 11/1997 Nakagawa .............. F16D 27/14 310/68 C
5,800,137 A * 9/1998 Eitai ................... F04B 27/0895 403/2
5,819,882 A * 10/1998 Reynolds ............ F16D 65/0006 188/73.35
5,862,890 A * 1/1999 Long ....................... F16D 55/36 188/73.36
6,079,489 A * 6/2000 Hult ........................ F16D 59/00 166/78.1
6,357,561 B2 * 3/2002 Ruiz ..................... F16D 65/123 188/218 XL
6,364,772 B1 * 4/2002 Sugden ..................... F16D 9/02 464/158
8,973,721 B2 * 3/2015 Wenckel ................. F16D 55/02 188/74
10,408,290 B2 * 9/2019 Leiva .................... F16D 65/847
10,876,480 B2 12/2020 Hamp
12,000,444 B2 * 6/2024 Prouzet ................... F16D 55/30
12,416,340 B2 * 9/2025 Delbos ...................... F16D 9/08
2005/0058536 A1 * 3/2005 Podratzky ............... B64C 27/32 415/123
2005/0088272 A1 * 4/2005 Yoshikawa .......... H01H 37/765 337/401
2006/0244310 A1 * 11/2006 DeVlieg ............... B60T 17/221 303/155
2007/0080033 A1 * 4/2007 Kowatsch ............ F16D 63/004 188/185
2007/0119664 A1 * 5/2007 Perrault .................. F16D 65/18 188/73.46
2013/0327600 A1 * 12/2013 Wenckel ................. F16D 51/10 188/72.1
2019/0136921 A1 * 5/2019 Prouzet ............... F16D 65/0081
2019/0136977 A1 5/2019 Prouzet
2020/0149603 A1 * 5/2020 Prouzet ................. F16D 65/847
2022/0325761 A1 * 10/2022 Prouzet ................... F16D 55/32
2024/0271672 A1 * 8/2024 Shahin ................. B23Q 1/4804

* cited by examiner

AIRCRAFT BRAKE WITH THERMAL FUSE

CROSS-REFERENCE TO RELATED APPLICATIONS

This application claims priority to European Patent Application No. 21290056.7 filed Sep. 10, 2021, the entire contents of which is incorporated herein by reference.

TECHNICAL FIELD

The present disclosure relates to a brake for an aircraft and a method of operating the brake.

BACKGROUND

It is common to use brakes in an aircraft to brake rotating components. For example, a helicopter may be provided with a brake to rapidly slow the rotor rotation after the engine has been shut down, after landing. The brake may also be used to stop the helicopter rotor from rotating under e.g. gusts of wind, while the helicopter is grounded. Similarly, a brake may be provided on an aircraft propulsion system, such as turbopropellor (turboprop), turbofan, prop fan, open rotor etc. to rapidly slow rotation after the engine has been switched off, after landing. The brake may also be used to stop the rotor from rotating under e.g. gusts of wind, while the aircraft is grounded It is possible that the brake may be accidentally applied while the engine or propeller is still running, for example, due to a system failure. This can lead to an abnormally high amount of energy being generated by the brake which can cause excessive heating of the brake, potentially causing a fire or thermally damaging aircraft or engine components.

Such conventional brakes have generally been considered satisfactory for their intended purpose but it is desirable to mitigate the risk of overheating of a brake.

SUMMARY

According to a first aspect, there is provided a brake for an aircraft, the brake. The brake includes: a housing; a shaft defining an axis and extending into the housing; a floating brake disk arranged to rotate with the shaft and arranged to be axially movable, along the axis, within the housing; a static brake pad arranged on a first side of the floating brake disk; a movable brake pad arranged on a second, opposite, side of the floating brake disk; biasing means for moving the movable brake pad relative to the housing to press the movable brake pad against the floating brake disk, and thereby to press the floating brake disk against the static brake pad to apply braking force to the floating brake disk; and a thermal fuse in thermal contact with the static brake pad, the thermal fuse having a fusing temperature, T, above which the thermal fuse fuses, wherein the thermal fuse is arranged such that, before it fuses, the static brake pad is axially fixed relative to the housing, and after it fuses, the static brake pad is free to move axially relative to the housing away from the floating brake disk.

The floating brake disk is considered to be "floating" because it is axially movable relative to the housing. This floating behaviour relative to the housing may be achieved in different ways. For example, the floating brake disk may be axially movable relative to the shaft, and the shaft may be axially fixed relative to the housing. In this example, the brake disk may, for example, be connected to the shaft via splines that allow movement of the floating brake disk along the shaft axis ensuring that rotation of the shaft causes rotation of the floating brake disk. Alternatively, the floating brake disk may be axially fixed to the shaft or formed integral with the shaft, and wherein the shaft is axially movable relative to the housing.

The static brake pad may be free to move axially along a first axial length after the thermal fuse has fused; and a hard stop is formed in the housing at a location axially in-between the static brake pad and the movable brake pad. The movable brake pad may comprise a flange having a flange surface arranged axially aligned with and facing the hard stop such the flange cannot move axially past the hard stop. A second axial length may be defined as an axial length between the flange surface and the hard stop at a position where the movable brake pad first makes contact with the floating brake disk; wherein the first length is longer than the second length. As such, the static brake pad may always have room to move back from the floating brake disk, even when the movable brake pad is at its furthest limit of travel (i.e. abutting the hard stop).

The thermal fuse may have an axial length that is equal to or greater than the first axial length.

The thermal fuse may comprise a eutectic material; wherein the fusing temperature, T, is a melting temperature of the eutectic material.

The thermal fuse may comprise a continuous-fibre reinforced composite, CFRC, material that comprises: one or more fibres, and a resin having a glass transition temperature, Tg; wherein the fusing temperature, T, is the glass transition temperature, Tg. The resin may be a thermoplastic resin or a thermoset resin.

The thermal fuse may further comprise a thermally conductive material extending at least partially along a length of the thermal fuse; wherein the thermally conductive material is selected to have a higher thermal conductivity than a thermal conductivity of the CFRC material.

The thermal fuse is in direct physical contact with the static brake pad.

The brake may further comprise: a member in abutment with the static brake pad, whereby, in an initial position, the member abuts the static brake pad and prevents axial movement of the static brake pad relative to the housing; a spring may be arranged to bias the member away from the initial position and towards a second position in which the member no longer prevents axial movement of the brake pad relative to the housing; wherein the thermal fuse is arranged to hold the member in the initial position, against the bias of the spring, until the thermal fuse fuses.

The second position may be located radially inwards, towards the shaft axis (X), from the initial position, and the member may have a slanted face such that a radially outward portion of the member, radially outward from the shaft axis (X), is spaced apart from the static brake pad in the initial position. This may assist sliding of the member to the second position, even when axially loaded from the static brake pad.

The member may be a first end of a rod; wherein the rod is arranged to be pivotable, under the bias from the spring around a pivot; wherein the thermal fuse is arranged to hold the rod in the initial position until the thermal fuse fuses; and wherein the spring is arranged to bias the rod to pivot around the pivot point to the second position after the thermal fuse has fused.

The member may be a piston, and the spring may be arranged within the housing to bias the piston radially inwards towards the shaft axis; wherein the thermal fuse is arranged radially inward of, and in abutment with, the piston when the piston is in the initial position.

The brake may comprise a plurality of thermal fuses, located at a plurality of positions around a circumference of the static brake pad.

According to a second aspect, there is provided a method of operating the aircraft brake of the first aspect, the method including mounting the thermal fuse in the housing to fix the static brake pad while the thermal fuse is unfused, and fusing the thermal fuse using heat generated between the static brake pad and the floating brake disk to allow the static brake pad to move axially relative to the housing away from the floating brake disk.

BRIEF DESCRIPTION OF THE DRAWINGS

Certain embodiments of the present disclosure will now be described in greater detail by way of example only and with reference to the accompanying drawings in which.

DETAILED DESCRIPTION

Figure 1:
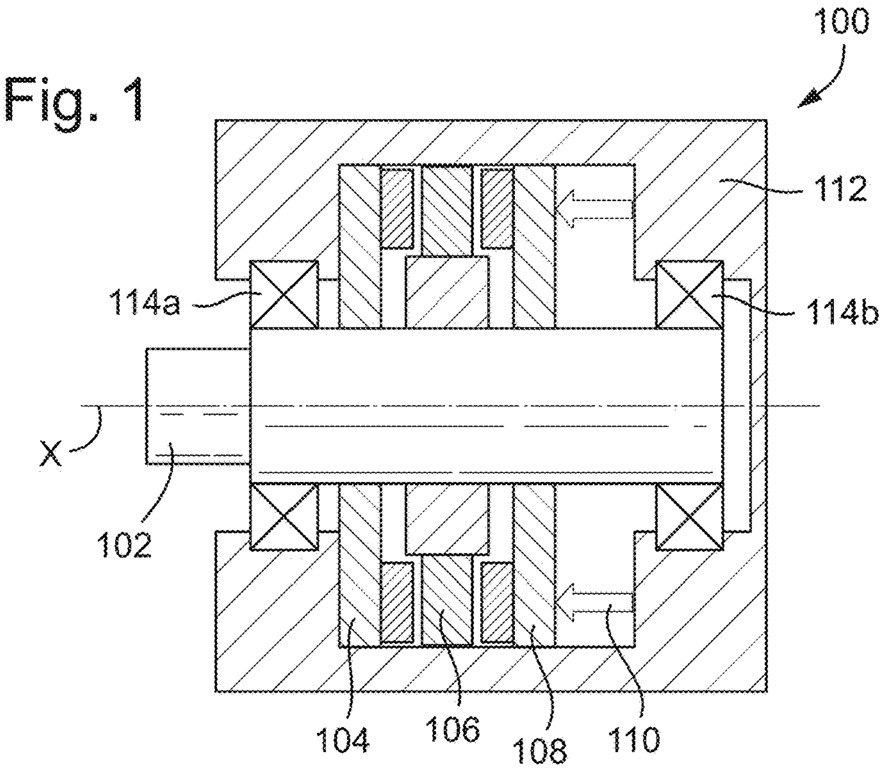
FIG. 1 shows an aircraft brake according to the prior art.

FIG. 1 shows a known design of aircraft brake 100. The aircraft brake 100 comprises a shaft 102 extending into a brake housing 112. Inside the brake housing 112, a floating brake disk 106 is mounted on the shaft 102, e.g. by splines or teeth, such that the floating brake disk 106 may move axially along a shaft axis Y, and is fixed to rotate with the shaft 102. On one axial side of the floating brake disk 106 is a static brake pad 104. The static brake pad 104 is connected to the housing and is fixed against axial movement and is fixed against rotation within the housing. On the opposite axial side of the floating brake disk 106 is a movable brake pad 108. The movable brake pad 108 is fixed against rotation within the housing 112 (e.g. by splines), and may move axially within the housing 112 under force provided by biasing means 110. The biasing means 110 may be an electric actuator or a hydraulic actuator for example. A pair of bearings 114*a,b* support the shaft 102 for rotation within the housing 112. The shaft 102 connects to a rotating part of an aircraft, such as to a propeller or rotor (not shown), such that when the brake 100 brakes rotation of the shaft 102, this brakes rotation of the propeller or rotor.

To activate the aircraft brake 100, the biasing means 110 is activated so as to push the movable brake pad 108 axially against the floating brake disk 106. The pressure from the movable brake pad 108 pushes the floating brake disk 106 along the shaft 102 to abut against the static brake pad 104. Once the floating brake disk 106 is in contact with the static brake pad 104, further pressure applied by the biasing means 110 squeezes the floating brake disk 106 between the two brake pads 104,108. The friction between these parts then acts to slow any rotation of the floating brake disk and thereby slow rotation of the shaft 102. When the shaft 102 is already static, application of the brake 100 merely acts to prevent rotation from starting (e.g. due to gusts of wind acting on a rotor connected to the shaft 102).

It is common to design such an aircraft brake 100 for normal conditions under which it can slow down a freely-rotating rotor (i.e. a rotor that is spinning but is not currently being actively driven by an aircraft engine), and such that it can prevent rotation of a static rotor e.g. under gusts of wind. However, if the rotor (and thereby the shaft 102) is being driven in rotation, e.g. by an aircraft engine, when the brake 100 is applied, an excessive amount of heat may be generated in the brake 100. This may be termed abnormal operation of the brake 100. This excessive amount of heat may heat up the overall brake 100, in particular the brake housing 112, to be hot enough to cause a fire or to damage nearby aircraft components. It is desirable to avoid excessive heating in a brake unit, particularly under abnormal operation.

Figure 2:
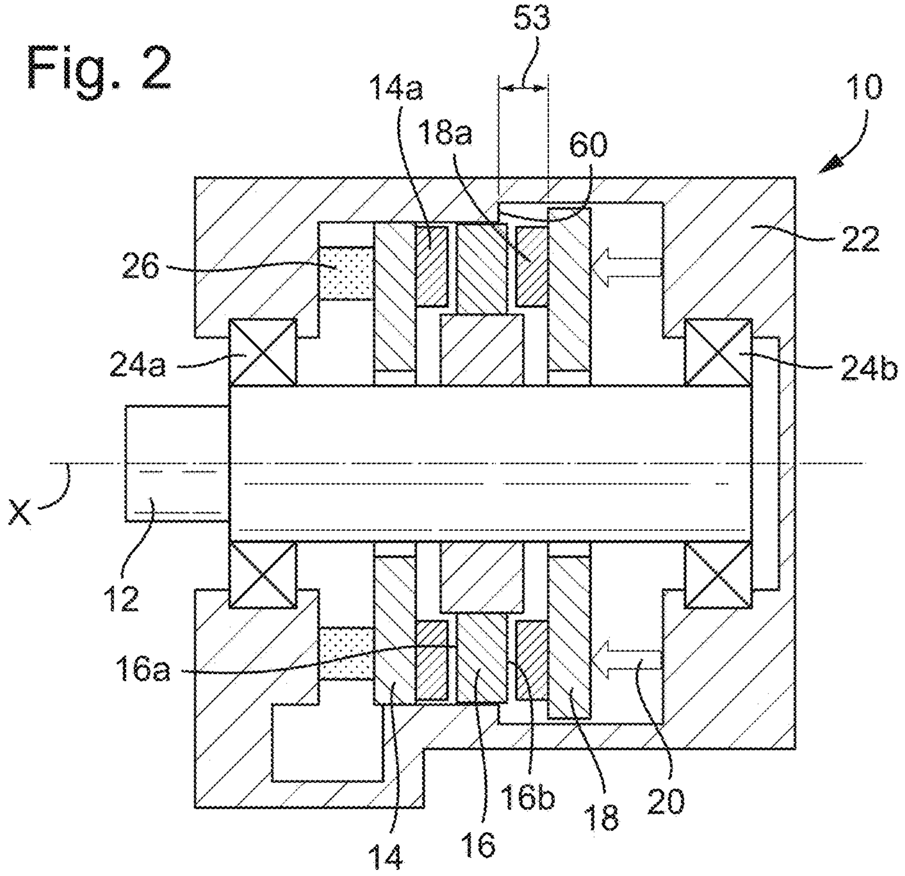
FIG. 2 shows an aircraft brake in the disengaged position.

FIG. 2 shows a new design of brake for an aircraft, where the brake is not currently applying braking force.

FIG. 2 shows a brake 10 comprising a shaft 12, a static brake pad 14, a floating brake disk 16, a movable brake pad 18, biasing means 20, and a housing 22.

Inside the brake housing 22, the floating brake disk 16 is mounted on the shaft 12, e.g. by splines or teeth, such that the floating brake disk 16 may move axially along a shaft axis X, and is fixed to rotate with the shaft 12. On a first axial side 16*a* of the floating brake disk 16 is a static brake pad 14. The static brake pad 14 is connected to the housing 22 and is (initially) fixed against axial movement and is fixed against rotation within the housing 22. On the opposite axial side (i.e. second side 16*b*) of the floating brake disk 16 is a movable brake pad 18. The movable brake pad 18 is fixed against rotation within the housing 112 (e.g. by splines), and may move axially within the housing 22 under force provided by biasing means 20. The biasing means 20 may be an electric actuator or a hydraulic actuator for example. Any suitable means for moving the brake pad 18 to bias against the floating brake disk may be used. A hard stop 60 is formed in the housing 22 to limit axial movement of the movable brake pad 18.

In an alternative, the brake disk 16 may be secured to the shaft (e.g. via splines) or the shaft 12 may be integrally formed with the brake disk 16 and, in this case, the shaft 12 may be floating within the housing 22, i.e. the shaft 12 as a whole may move axially within the housing along axis X. As such, the brake disk 16 is considered to be "floating" in this case, as it is axially movable within the housing under pressure from the movable brake pad 18.

A pair of bearings 24*a,b* support the shaft 12 for rotation within the housing 22. The shaft 12 may be connected to a rotating part of an aircraft, such as to a propeller or rotor (not shown), such that when the brake 10 brakes rotation of the shaft 12, this brakes rotation of the propeller or rotor.

As described in detail later, the static brake pad 14 is held axially static only during normal operation of the brake 10. When excessive heating occurs within the brake 10, the static brake pad 14 becomes free to move axially away from the movable brake pad 16.

The movable brake pad 18 comprises a braking surface 18*a* that faces towards the floating brake disk 16. The static brake pad comprises a braking surface 14*a* that faces towards the floating brake disk 16.

To activate the aircraft brake 10, the biasing means 20 is activated so as to push the movable brake pad 18 axially against the floating brake disk 16. The pressure from the movable brake pad 18 pushes the floating brake disk 16 axially along the shaft 12 to abut against the static brake pad

Figure 3:
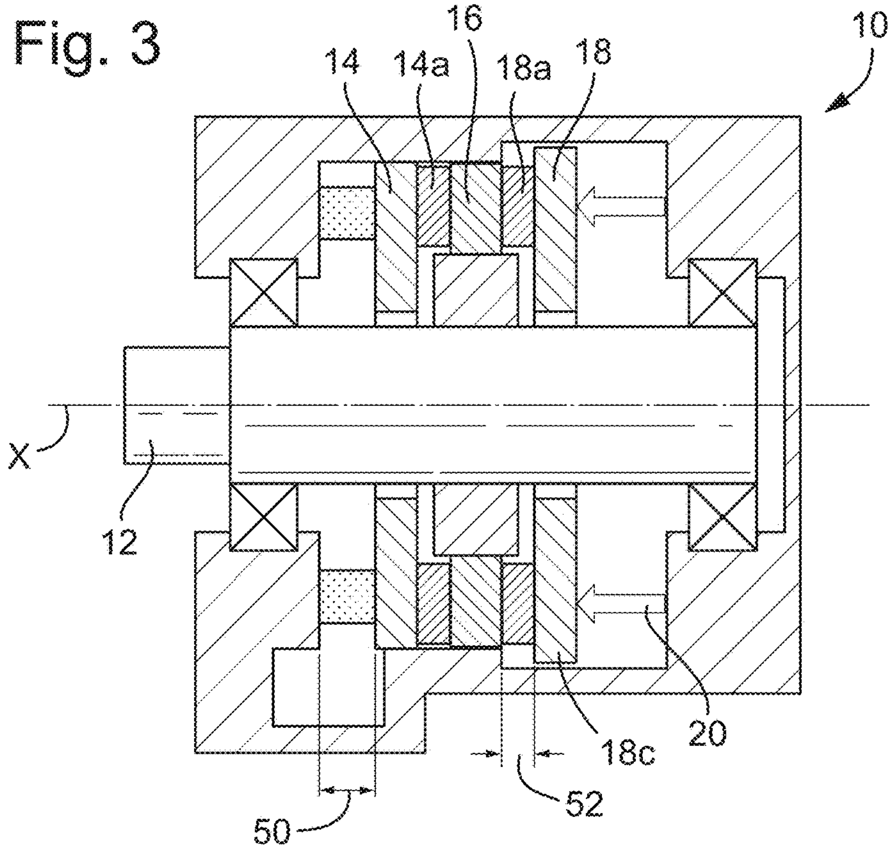
FIG. 3 shows an aircraft brake in the engaged position.

14. Once the floating brake disk 16 is in contact with the static brake pad 14, further pressure applied by the biasing means 20 squeezes the floating brake disk 16 between the two brake pads 14,18. This position of the brake 10 is shown in FIG. 3. The friction between the braking surface 18*a* of the movable brake pad 18 with the floating brake disk 16, and between the braking surface 14*a* of the static brake pad 14, acts to slow any rotation of the floating brake disk 106 and thereby slow rotation of the shaft 102. When the shaft 102 is already static, application of the brake 10 merely acts to prevent rotation from starting (e.g. due to gusts of wind acting on a rotor connected to the shaft 12). The braking surface 18*a* of the movable brake pad 18 may move axially beyond the hard stop, but the movable brake pad 18 may not move axially past the hard stop 60. This may be achieved, e.g. as shown in FIG. 3, by having the braking surface 18*a* extend axially outward from the brake pad 18, and have the braking surface 18*a* located radially inward from an outer edge of the movable brake pad 18. The brake pad 18 may thus be considered to have a flange 18*c* extending radially outward. The flange 18*c* may eventually come into contact with the hard stop 60 and this may prevent further axial movement of the movable brake pad 18. When the movable brake pad first contacts the floating brake disk 16, the flange 18*c* is axially spaced from the hard stop 60 by a distance 52. When the brake 10 is not applying braking force, the movable brake pad 18 is held at a distance 53 from the floating brake disk 16. This distance 52 is defined as the distance between the flange 18*c* of the movable brake pad 18 and the hard stop 60, and this distance 53 is larger than the aforesaid distance 52 during the braking position.

A thermal fuse 26 is located between the static brake pad 14 and the housing 22. In the example brake 10 shown in FIGS. 2-5, the thermal fuse 26 sits directly in abutment with, at one end, the housing 22, and, at the other end, with the static brake pad 14. As described in detail later, the thermal fuse 26 may be located at different positions instead.

During normal operation of the brake 10, the thermal fuse 26 holds the static brake pad 14 at a fixed axial position (i.e. a fixed position along the axis X, defined by the shaft 12) within the housing 22. The thermal fuse 26 is located on the side of the static brake pad 14 opposite the braking surface 14*a*.

Specific examples of suitable thermal fuses will be described later. The thermal fuse 26 is designed to fuse at a well-defined predetermined temperature, T, at which point it loses structural integrity. For example, the thermal fuse 26 may melt, disaggregate, or buckle at the predetermined temperature T.

The brake 10 is designed such that, under normal braking operations, the amount of heat dissipated in the brake 10 during braking will not cause the thermal fuse 26 to exceed the predetermined temperature T. However, if the brake 10 experiences abnormal braking conditions, for example, if the brake 10 is activated when the shaft 12 is still being actively driven by an aircraft engine, then the temperature generated by friction between the floating brake disk 16 and the brake pads 14,18 may rise excessively high and may also rise very quickly. When the temperature of the thermal fuse 26 rises above the temperature T, the thermal fuse 26 fuses (i.e. loses structural integrity) and the static brake pad 14 is then free to move axially away from the floating brake pad 16. This disengages the brake 10, i.e. it prevents the brake 10 from further resisting rotation of the shaft 12, and this prevents further heating of the brake 10, even if the shaft 12 is still being driven in rotation e.g. by an aircraft engine.

The predetermined temperature T may be chosen so as to limit an overall temperature rise of the housing 22 under abnormal braking conditions. That is, when the thermal fuse 26 fuses at the predetermined temperature T, no further energy is dissipated as heat within the brake 10, and the heat energy that has already been generated in e.g. the brake pads 14,18 may gradually spread out to the housing 22.

As shown in FIG. 3, an axial length 50 is provided behind the static brake pad 14, the static brake pad 14 may move along this axial length 50 after the thermal fuse 26 has fused. In the embodiment shown in FIGS. 2-5, the axial length 50 is substantially equal to an axial length of the thermal fuse 26. Alternatively, there may be a recess (not shown) formed in one or both of the housing 22 and the movable brake pad 14, for receiving an end of thermal fuse 26 (e.g. to securely mount the fuse), in which case the overall length of the thermal fuse 26 may be slightly greater than the axial length 50.

When the brake 10 is first put into service, the braking surface 18*a* of the movable brake pad 18 has a first thickness. During the operational life of the brake 10, the braking surface 18*a* will gradually wear down and become thinner. Similarly, during the operational life of the brake 10, the braking surface 14*a* of the static brake pad will wear down and become thinner.

Figure 4:
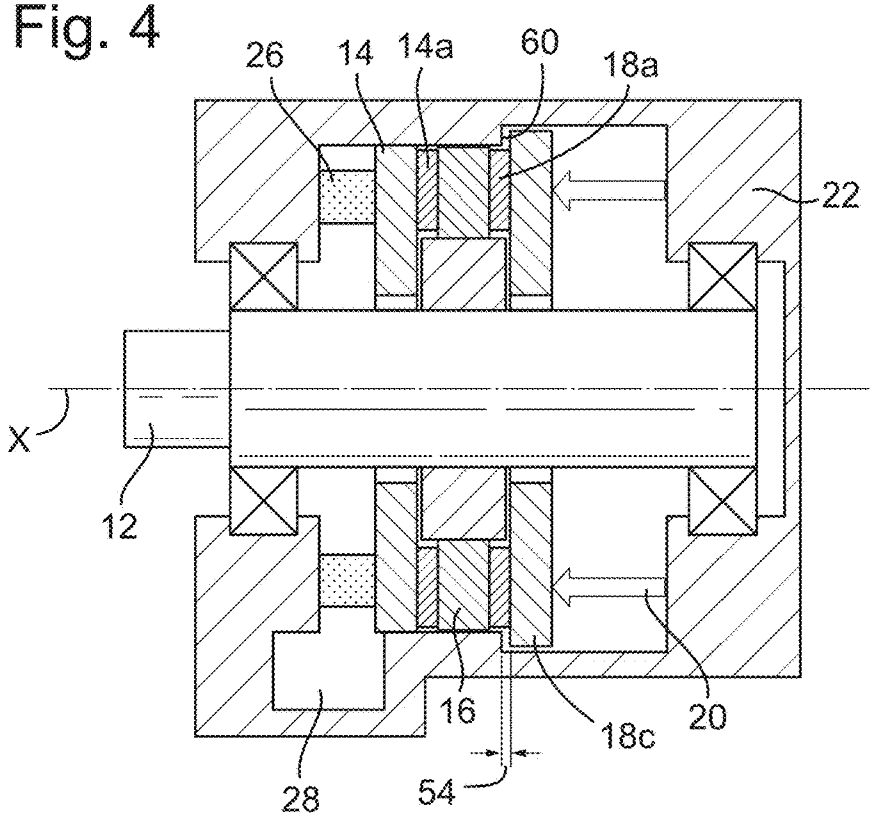
FIG. 4 shows an aircraft brake having worn brake pads in the engaged position.

FIG. 4 shows the brake 10 with worn down braking surfaces 14*a*,18*a*. After the braking surfaces 14*a*,18*a* have worn down somewhat, but while the thermal fuse 26 is still intact, the movable brake pad 18 is still able to squeeze the floating brake disk 16 against the static brake pad 14, without the flange 18*c* of the movable brake pad 18 coming into abutment with the hard stop 60. Of course, due to the thinner braking surfaces 14*a*,18*a*, the distance 54 between the flange 18*c* and the hard stop 60 during when the brake 10 is applied is smaller than when the brake 10 was first put into service.

Figure 5:
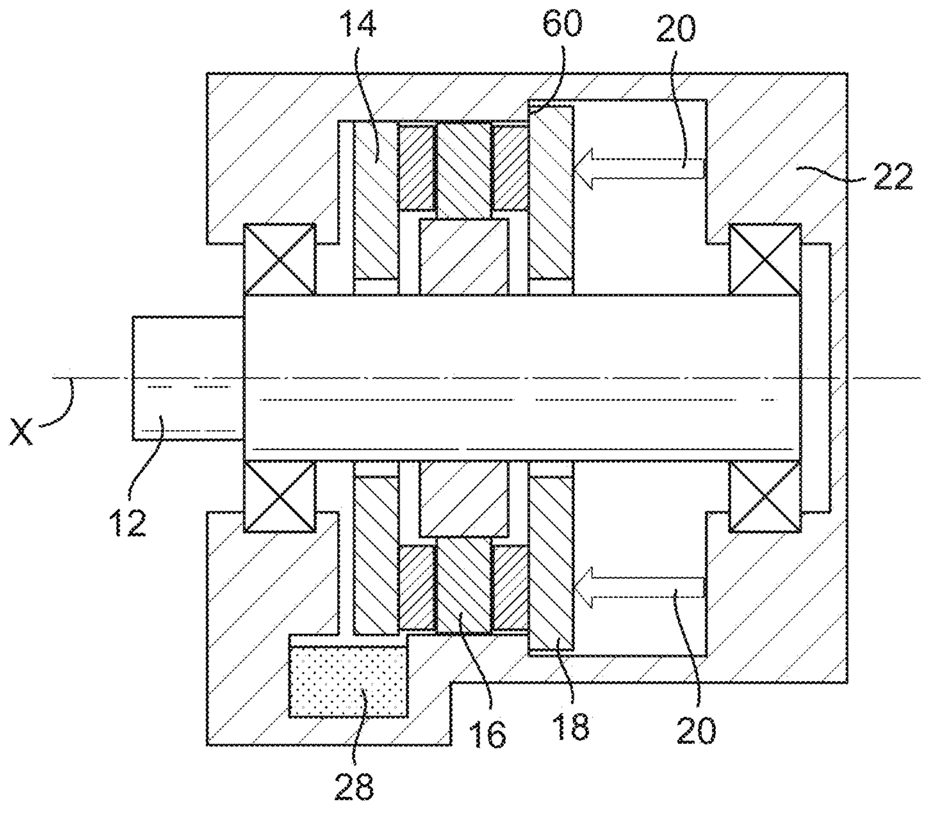
FIG. 5 shows an aircraft brake after an overheating event.

FIG. 5 shows the brake 10 after abnormal braking conditions have led to the thermal fuse 26 fusing. This Figure shows one example in which the thermal fuse 26 melts. Other thermal fuses 26, such as some of those described below, may not melt but may instead lose structural integrity or disaggregate and, for example, buckle under axial loading. Thus, FIG. 5 shows merely one example of the brake 10 after fusing of the thermal fuse 26.

In FIG. 5, the thermal fuse 26 has melted due to excessive heat generation in the static brake pad 14. This heat has been generated at the interface where the static brake pad 14 meets the floating brake disk 16, and this generated heat heats up the brake pad 14, which, by thermal conduction, heats up the thermal fuse 26. When the temperature in the thermal fuse 26 reaches the predetermined temperature, T, the thermal fuse 26 melts and, under the action of gravity, falls into a space 28 provided in the housing 22. The space 28 is positioned within the housing 22 so as to receive the molten thermal fuse material when the thermal fuse 26 melts. The size of the space 28 is also chosen to accommodate the amount of thermal fuse material.

When the thermal fuse 26 has fused, as shown in FIG. 5, the static brake pad 14 is then free to move axially away from the floating brake disk 16. During braking, the movable brake pad 18 is pushing against the floating brake disk 16 and therefore loading axially against the static brake pad 14 as well. However, the range of motion of the movable brake pad 18 towards the floating brake disk 16 and towards the static brake pad 14 is ultimately limited by the hard stop 60. The movable brake pad 18 will engage with the hard stop 60 before the static brake pad 14 has moved the full length 50.

That is, when the movable brake pad 18 is stopped from further axial movement by the hard stop 60, the static brake pad 14 still has space to move back further from the floating brake disk 16. As a result, the floating brake disk 16 will no longer be squeezed between the brake pads 14,18, even if the biasing means 10 has pushed the movable brake pad to its furthest possible position (i.e. to the hard stop 60). The floating brake disk 16 may move axially along the shaft 12. Once the floating brake pad 16 is no longer being squeezed from the first side 16*a* (i.e. where the static brake pad 14 was), the floating brake pad 16 will also no longer press strongly against the movable brake pad 18 either. As such, there will be very little, if any, frictional-heat generated at interface between the movable brake pad 18 and the floating brake disk 16 after the thermal fuse 26 has fused. In this manner, the brake 10 will rapidly disengage after the thermal fuse 26 fuses and there will be no further significant heat generation within the brake 10. This action is automatic when the temperature of the thermal fuse 26 rises above the predetermined temperature, T, and does not require, for example, any sensor-based monitoring of the brake temperature.

The thermal fuse 26 may be a ring-shaped piece that circumscribes the shaft 12. Alternatively, multiple thermal fuses 26 may be provided at different circumferential locations around the static brake pad 14, to act as "legs" spacing the static brake pad 14 from the housing 12. In the case of multiple thermal fuses, each thermal fuse 26 may be a cuboid or cylinder shape.

The thermal fuse 26 may be a eutectic material. A eutectic material is a material (typically a metal alloy) formed from two or more components, where both components within the alloy melt at the same temperature. As such, the overall eutectic material may have a well-defined melting point. Eutectic materials may exhibit very low creep under loading and may exhibit high thermal stability up to the melting temperature. This helps ensure the thermal fuse 26 holds the static brake pad 14 in a fixed position, even under braking loads and even under the heating experienced during normal operation.

Figure 6:
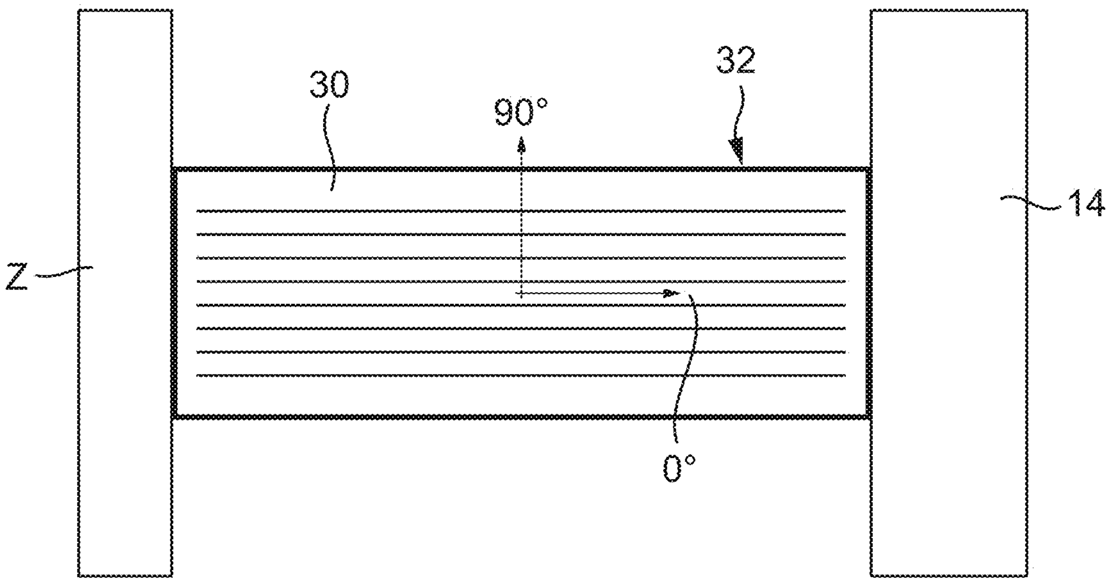
FIG. 6 shows an example thermal fuse.

In another example, shown in FIG. 6, the thermal fuse 26 may be formed from a continuous-fiber-reinforced composite (CFRC) material 30. For example, the CFRC material may be formed in a rod-shape or a cylinder. A CFRC material typically comprises a plurality of high-strength fibres, optionally woven together, that have been impregnated with a resin. The resin may be a thermoplastic. Thermoplastics have a glass transition temperature and this temperature may be well-defined for certain thermoplastics. Below the glass transition temperature, the thermoplastic may be essentially solid and have significant structural stiffness. Above the glass transition temperature, the thermoplastic may rapidly lose stiffness and become soft. Alternatively, the resin may be a thermoset resin having a glass transition temperature, Tg. Above the glass transition temperature, Tg, the thermoset resin may rapidly lose stiffness.

The example thermal fuse 26 shown in FIG. 6 is made from a CFRC material having two fibre directions, where the fibres in the first direction extending at 90 degrees to fibres in the direction. That is, the fibres in the first direction extend in an axial direction along an axis Z, which is a long axis of the rod-shaped thermal fuse 26. The fibres in the second direction extend circumferentially around the axis Z. When in place within the brake 10, the axis Z of the thermal fuse 26 of shown in FIG. 5 is parallel to the shaft axis X. This means that the loading forces on the thermal fuse 26, from the biasing means 10 squeezing the brake pads 14,18, extends along the axis Z. The fibres at 90 degrees are optional. As such, in an alternative, the CFRC material may be a unidirectional CFRC material, where fibres only extend in a single direction within the material. In this example, the fibres may be oriented along the axis Z of the thermal fuse 26.

While the temperature remains below the glass transition temperature, the thermal fuse 26 of FIG. 6 has sufficient stiffness to hold the static brake pad 14 in place under loading forces from the biasing means 10. When abnormal braking conditions occur, such that the thermal fuse 26 of FIG. 6 heats up above the glass transition temperature of the resin, the thermal fuse 26 loses structural integrity and will buckle under the aforesaid loading forces. At that point, the static brake pad 14 may move axially away from the floating brake disk 16 and this stops further heat generation in the brake 10.

CFRC materials may have very low creep under loading and may be very stable right up to the glass transition temperature. These properties mean that a thermal fuse 26 formed from CFRC material may comfortably withstand the loading and heating under normal conditions of the brake 10, without noticeable degradation unless and until the predetermined temperature is exceeded.

Some CFRC materials have low thermal conductivity. This can lead to the situation where a portion of the thermal fuse 26 nearest the static brake pad 14 is at a higher temperature (possibly at a temperature above the predetermined temperature), while a portion distal from the static brake pad 14 may be at a lower temperature (possibly below the predetermined temperature). In this case, the thermal fuse 26 may not fuse all at once, but may only partially fuse or fuse in stages. To help ensure the thermal fuse 26 fuses substantially all-at-once, the thermal fuse shown in FIG. 6 may further comprise a thermally conductive material 32, such as a metal or a liquid, that has a higher thermal conductivity than the CFRC material. The thermally conductive material 32 depicted in Figure is a sheath over the outer surface of the CFRC material 30. However, the thermally conductive material may alternatively extend through the middle of the CFRC material 30. The thermally conductive material 32 may be a metal sheath. Alternatively, the thermally conductive material may be a liquid stored in a cavity defined by the CFRC material 30. The thermally conductive material 32 can transfer heat quickly along a length of the thermal fuse 26. This may ensure that the resin nearest the static brake pad 14 is at the same, or approximately the same, temperature as resin distal from the static brake pad 14 and, as a consequence, the thermal fuse 26 thus formed may be more certain to fuse all at once (e.g. when the temperature rises above the glass transition temperature). It is desirable, but not essential, that the thermally conductive material 32 is in direct abutment with the static brake pad 14 to ensure rapid and even heating of the thermal fuse 26.

In FIGS. 2-5, the thermal fuse 26 directly abuts a side of the static brake pad 14 opposite the floating brake disk 16. The thermal fuse 26 is shown abutting, at one end thereof, the housing 22, and, at the other end thereof, the static brake pad 14.

Figure 7B:
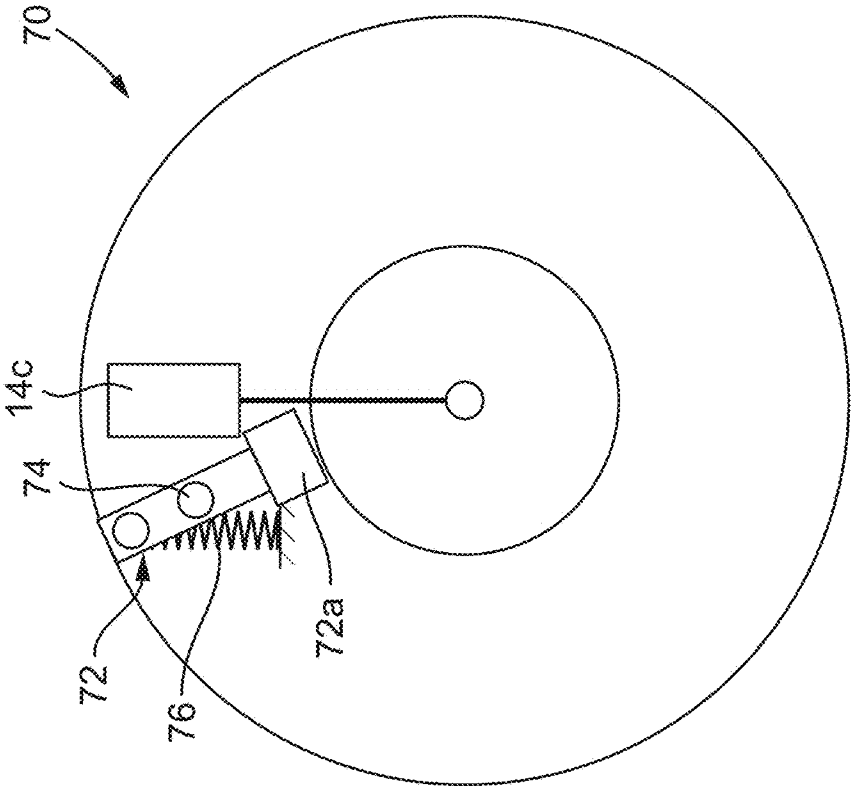
FIGS. 7A and 7B show an alternative thermal fuse arrangement for the aircraft brake, both before and after an overheating event.
Figure 7A:
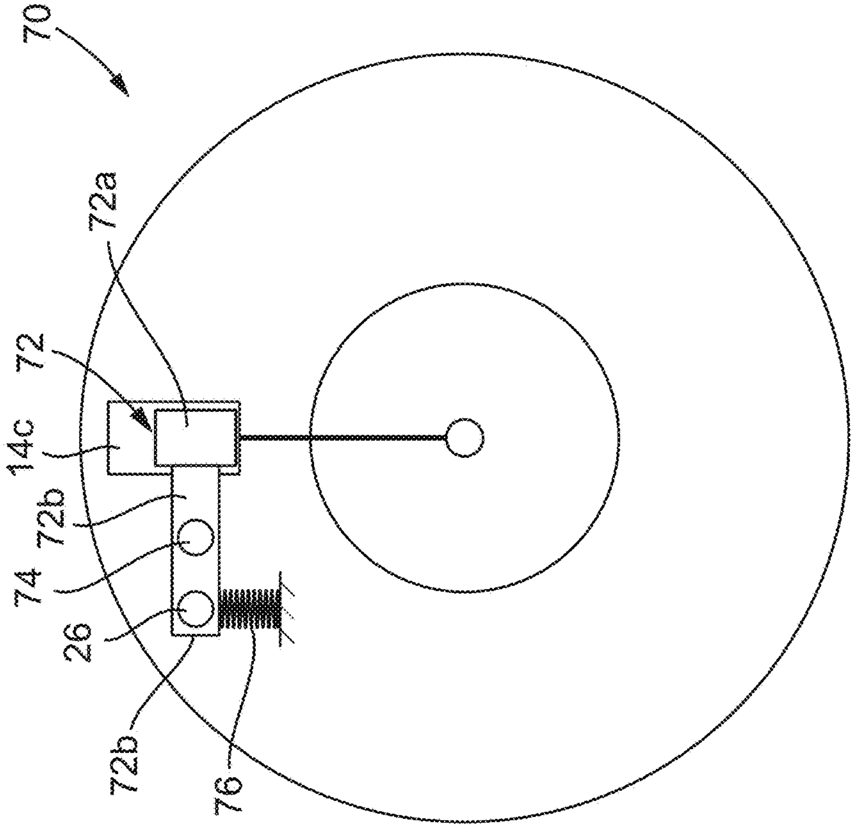
Figure 8A:
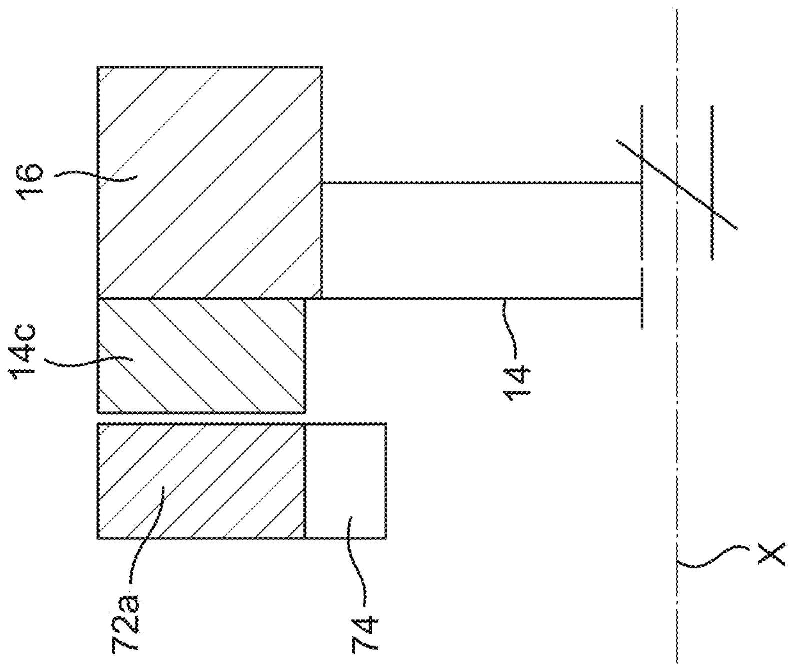
FIGS. 8A and 8B show a different perspective the alternative thermal fuse arrangement.
Figure 8B:
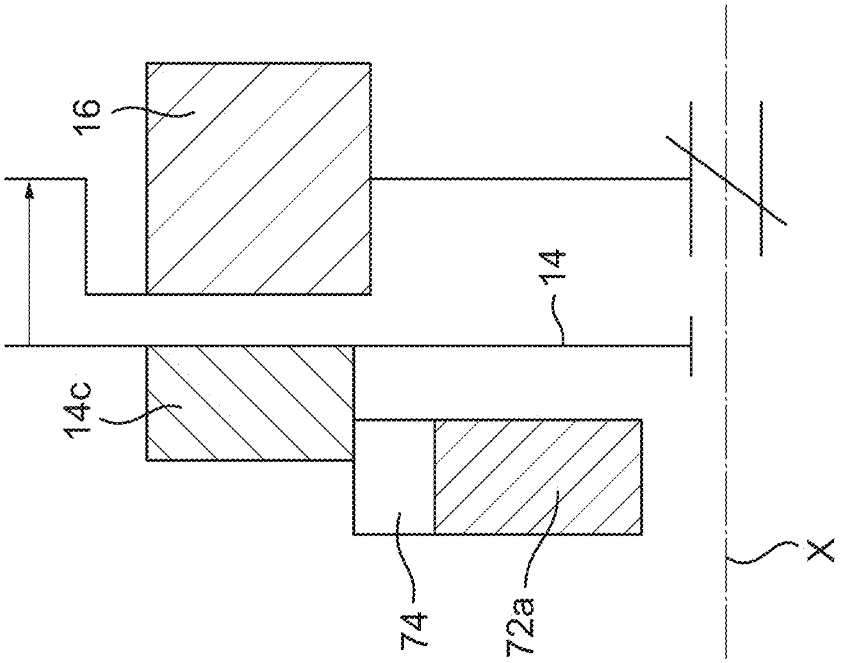

FIGS. 7A, 7A, 8A, and 8B show an alternative design of aircraft brake. The brake 70 shown in these Figures is the same as the brake 10 described above in relation to FIGS. 2-5, except for the region around the thermal fuse 26. As such, the brake 70 has the same arrangement of the shaft 12, the static brake pad 14, the floating brake disk 16, the movable brake pad 18, and the biasing means 20 as described above in relation to FIGS. 2-5.

FIGS. 7A and 8A show the brake 70 before any abnormal operation (i.e. before any overheating event that fuses the thermal fuse 26). In this initial position, a protrusion 14*c* of the static brake pad 14 abuts against a first end 72*a* of a rod 72. The first end 72*a* of the rod (initially) prevents axial movement of the static brake pad 14 within the housing 22. The rod 72 has a second end 72*b* and a spring 76 is connected to the rod 72 near the second end 72*b*. A pivot point 74 is located in between the first end 72*a* and the second end 72*b* of the rod 72. The spring 76 biases the rod 72 to pivot around the pivot point 74 but, in the initial position, the thermal fuse 26 prevents pivoting of the rod 72.

As such, in the initial position, the rod 72 is held such that the first end 72*a* abuts the protrusion 14*c* of the static brake pad 14. The thermal fuse 26 extends from the housing 22 into the rod 72 at a location near where the spring 76 abuts the rod 72. While the thermal fuse 26 has its structural integrity, it acts as a pin extending into the rod 72 and the strength of the pin prevents pivoting of the rod 72 under the action of the spring 76.

When an abnormal braking operation occurs, such that excessive heat is generated at the brake pads 14,18, heat generated in the static brake pad 14 is thermally conducted to the thermal fuse 26. When the temperature of the thermal fuse 26 exceeds the predetermined temperature, T, the thermal fuse 26 fuses. After fusing, the thermal fuse 26 no longer resists pivoting of the rod 72 under the biasing force of the spring 76. As such, the spring 76 now causes the rod 72 to pivot in a plane normal to the shaft axis X. This pivoting movement moves the first end 72*a* of the rod 72 away from its abutment with the static brake pad 14. This position is shown in FIGS. 7B and 8B. The static brake pad 14 is thereafter free to move (e.g. under loading forces from the movable brake pad 18, transmitted through the floating brake disk 16) axially away from the floating brake disk 16. In the same manner as described above in relation to FIGS. 2-5, when the static brake pad 14 is free to move away from the floating brake disk 16, this disengages the brake 70 and thereby prevents further heat generation via friction between the brake pads 14,18 and the floating brake disk 16.

To assist the rod 72 in sliding relative to the static brake pad 14 under the bias of the spring 76, after the thermal fuse 26 has fused, a portion of the rod end 72*a* may have a slightly slanted face in contact with the static brake pad 14 such that a radially outward region of the slanted face (radially outward from the shaft axis X) is slightly spaced apart from the static brake pad 14. This slant may allow the rod end 72*a* to slide more freely radially inwards to a position where it no longer prevents movement of the static brake pad 14 away from the floating brake disk 16. This may assist the rod 72 in moving without requiring any lubricant between the rod 72 and static brake pad 14.

Figure 9B:
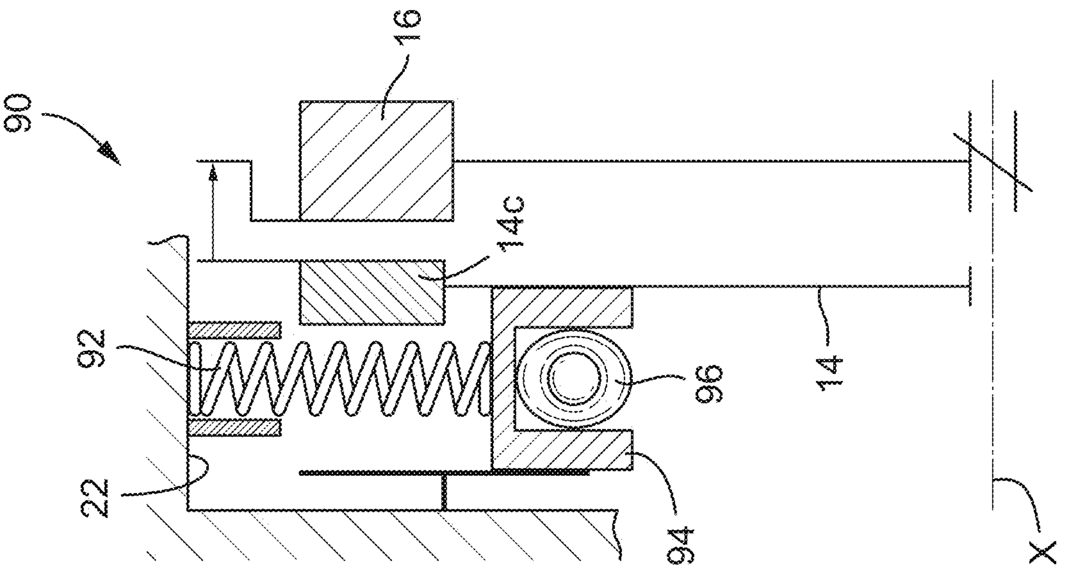
FIGS. 9A and 9B show a yet further aircraft brake.
Figure 9A:
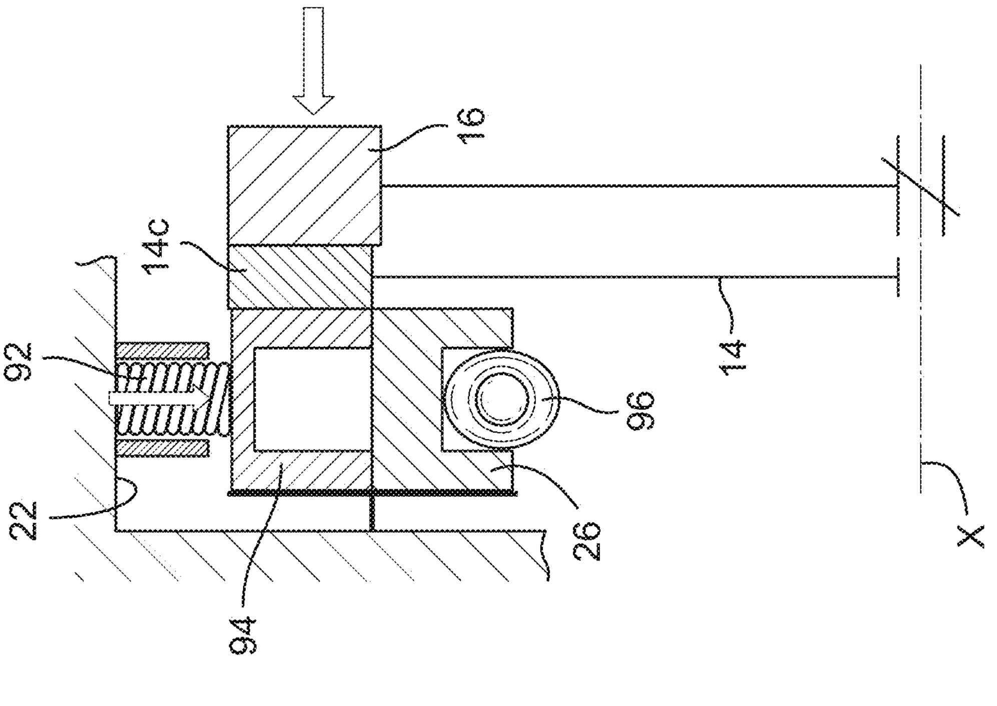

FIGS. 9A and 9B show yet a further design of brake 90. The brake 90 shown in these Figures is the same as the brake 10 described above in relation to FIGS. 2-5, and the same as the brake 70 described in relation to FIGS. 7A-8B, except for the region around the thermal fuse 26. That is, the brake 90 has the same arrangement of the shaft 12, the static brake pad 14, the floating brake disk 16, the movable brake pad 18, and the biasing means 20 as described above in relation to FIGS. 2-8B.

In the example shown in FIG. 9A, before any abnormal braking operation has occurred, a spring 92 is compressed between the housing 22 and a piston 94. The compressed spring 92 biases the piston 94 to move in a generally radially-inward direction, where "radially-inward" means towards the axis X of the shaft 12. The thermal fuse 26 rests between the piston 94 and a pin 96 connected to the housing 22. Before the thermal fuse 26 fuses, its structural integrity prevents the piston 94 from moving radially inward under the bias of the spring 92. In this example brake 90, the protrusion 14*c* of the static brake pad 14 rests against the piston 94, such that the piston 94 prevents axial movement of the static brake pad 14 within the housing 22.

When an abnormal braking operation occurs such that excessive heat is generated at the brake pads 14,18, heat from the static brake pad 14 is conducted to the thermal fuse 26. When the temperature of the thermal fuse 26 exceeds the predetermined temperature, T, the thermal fuse 26 loses structural integrity such that it no longer prevents movement of the piston 94 under action of the spring 92. The spring 92 therefore pushes the piston 94 generally radially inwardly and this moves the piston 94 away from its abutment with the static brake pad 14. The piston 94 may be pushed, for example, so as to come into abutment with the pin 96 that previously supported the thermal fuse 26 (i.e. before the thermal fuse 26 fused).

This then allows the static brake pad 14 (e.g. under loading forces from the movable brake pad 18, transmitted through the floating brake disk 16) to move axially away from the floating brake disk 16. In the same manner as described above in relation to FIGS. 2-8B, when the static brake pad 14 can move away from the floating brake disk 16, this disengages the brake 90 and thereby prevents further heat generation via friction between the brake pads 14,18 and the floating brake disk 16.

To assist the piston 94 in sliding relative to the static brake pad 14 under the bias of the spring 92, after the thermal fuse 26 has fused, the piston 94 may have a slightly slanted face in contact with the static brake pad 14 such that a radially outward region of the slanted face (radially outward from the shaft axis X) is slightly spaced apart from the static brake pad 14. This slant may allow the piston to slide more freely radially inwards to a position where it no longer prevents movement of the static brake pad 14 away from the floating brake disk 16. This may assist the piston 94 in moving without requiring any lubricant between the piston 94 and static brake pad 14.

The reader will appreciate that in each design described herein above in relation to FIGS. 2-9B, the thermal fuse 26, in its non-fused state, prevents axial movement of the static brake pad 14 away from the floating brake disk 16. Further, in each design, when the thermal fuse 26 fuses, the static brake pad 14 is thereafter free to move axially away from the floating brake disk 16 and this therefore disengages the brake and prevents further heat generation by friction between the brake pads 14,18 and the floating brake disk 16.

In the arrangements shown in FIGS. 7A-9B, the thermal fuse 26 is in thermal contact with the static brake pad 14, but is not necessarily in direct physical abutment with the static brake pad 14.

In the example shown in FIGS. 2-5, frictional heat generated at the interface between the static brake pad 14 and the floating brake disk 16 travels through the thickness of the static brake pad 14 before heating the thermal fuse 26.

In the example shown in FIGS. 7A-8B, the frictional heat generated at the interface between the static brake pad 14 and the floating brake disk 16 travels through the thickness of the static brake pad 14 before heating the rod 72, and the heat travels through the rod 72 to the thermal fuse 26.

In the example shown in FIGS. 9A and 9B, frictional heat generated at the interface between the static brake pad 14 and the floating brake disk 16 travel through the thickness of the static brake pad 14 to heat the piston 94, and the heat travels through the piston 74 to the thermal fuse 26.

Any of the thermal fuse 26 compositions (e.g. a eutectic material, a CFRC material etc.) described hereinabove, may be used with any of the designs of brake 10,70,90 depicted in FIGS. 2-9B.

While the above has been described in relation to a brake having a single movable brake pad and a single floating brake disk, the present arrangement could equally work with a stacked brake in which, there is the static brake pad and thermal fuse (i.e. as described above) at one end, and then a plurality of floating brake disks interleaved with a plurality of movable brake pads. At the opposite end, there is a final movable brake pad that is driven by biasing means, e.g. an actuator. When the movable brake pad driven by biasing means is driven in a direction towards the static brake pad, the plurality of floating brake disks and plurality of (other) movable brake pads are all squeezed together to brake rotation of the shaft. As above, if the temperature of the thermal fuse exceeds the predetermined temperature, it will fuse and the movable brake pad will be able to move axially away from the stack of movable brake pads/floating brake disks, so as disengage the brake.

The invention claimed is:

1. A brake for an aircraft, the brake comprising:

a housing;

a shaft defining an axis (X) and extending into the housing;

a floating brake disk arranged to rotate with the shaft and arranged to be axially movable, along the axis (X), within the housing;

a static brake pad arranged on a first side of the floating brake disk (16);

a movable brake pad arranged on a second, opposite, side of the floating brake disk;

biasing means for moving the movable brake pad relative to the housing to press the movable brake pad against the floating brake disk, and thereby to press the floating brake disk against the static brake pad to apply braking force to the floating brake disk; and a thermal fuse in thermal contact with the static brake pad, the thermal fuse having a fusing temperature, T, above which the thermal fuse fuses.

2. The brake for an aircraft according to claim 1, wherein the floating brake disk is axially movable relative to the shaft, and wherein the shaft is axially fixed relative to the housing; or wherein the floating brake disk is axially fixed to the shaft or formed integral with the shaft, and wherein the shaft is axially movable relative to the housing.

3. The brake for an aircraft according to claim 1, wherein the static brake pad is free to move axially along a first axial length after the thermal fuse has fused;

wherein a hard stop is formed in the housing at a location axially in-between the static brake pad and the movable brake pad;

wherein the movable brake pad comprises a flange having a flange surface arranged axially aligned with and facing the hard stop such the flange cannot move axially past the hard stop;

wherein a second axial length is defined as an axial length between the flange surface and the hard stop at a position where the movable brake pad first makes contact with the floating brake disk; and wherein the first length is longer than the second length.

4. The brake for an aircraft according to claim 3, wherein the thermal fuse has an axial length, wherein the axial length of the thermal fuse is equal to or greater than the first axial length.

5. The brake for an aircraft according to claim 1, wherein the thermal fuse comprises a eutectic material; wherein the fusing temperature, T, is a melting temperature of the eutectic material.

6. The brake for an aircraft according to claim 1, wherein the thermal fuse comprises a continuous-fibre reinforced composite, CFRC, material that comprises:

one or more fibres, and a resin having a glass transition temperature, Tg;

wherein the fusing temperature, T, is the glass transition temperature, Tg;

wherein the resin is a thermoplastic resin or wherein the resin is a thermoset resin.

7. The brake for an aircraft according to claim 6, wherein the thermal fuse further comprises a thermally conductive material extending at least partially along a length of the thermal fuse; and wherein the thermally conductive material is selected to have a higher thermal conductivity than a thermal conductivity of the CFRC material.

8. The brake for an aircraft according to claim 1, wherein the thermal fuse is in direct physical contact with the static brake pad.

9. A brake for an aircraft, the brake comprising:

a housing;

a shaft defining an axis (X) and extending into the housing;

a floating brake disk arranged to rotate with the shaft and arranged to be axially movable, along the axis (X), within the housing;

a static brake pad arranged on a first side of the floating brake disk (16);

a movable brake pad arranged on a second, opposite, side of the floating brake disk;

biasing means for moving the movable brake pad relative to the housing to press the movable brake pad against the floating brake disk, and thereby to press the floating brake disk against the static brake pad to apply braking force to the floating brake disk;

a thermal fuse in thermal contact with the static brake pad, the thermal fuse having a fusing temperature, T, above which the thermal fuse fuses;

a member in abutment with the static brake pad, whereby, in an initial position, the member abuts the static brake pad and prevents axial movement of the static brake pad relative to the housing; and a spring arranged to bias the member away from the initial position and towards a second position in which the member no longer prevents axial movement of the brake pad relative to the housing;

wherein the thermal fuse is arranged to hold the member in the initial position, against the bias of the spring, until the thermal fuse fuses.

10. The brake for an aircraft according to claim 9, wherein the second position is radially inwards, towards the shaft axis (X), from the initial position, and wherein the member has a slanted face such that a radially outward portion of the member, radially outward from the shaft axis (X), is spaced apart from the static brake pad in the initial position.

11. The brake for an aircraft according to claim 9, wherein the member is a first end of a rod;

wherein the rod is arranged to be pivotable, under the bias from the spring around a pivot point;

wherein the thermal fuse is arranged to hold the rod in the initial position until the thermal fuse fuses; and wherein the spring is arranged to bias the rod to pivot around the pivot point to the second position after the thermal fuse has fused.

12. The brake for an aircraft according to claim 9, wherein the member is a piston, and wherein the spring is arranged within the housing to bias the piston radially inwards towards the shaft axis (X); and wherein the thermal fuse is arranged radially inward of, and in abutment with, the piston when the piston is in the initial position.

13. The brake for an aircraft according to claim 1, comprising a plurality of thermal fuses, located at a plurality of positions around a circumference of the static brake pad.

14. A method of operating the brake for an aircraft of claim 1, the method including:

mounting the thermal fuse in the housing to fix the static brake pad while the thermal fuse is unfused, and fusing the thermal fuse using heat generated between the static brake pad and the floating brake disk.

* * * * *